(12) United States Patent
Astegno et al.

(10) Patent No.: US 6,394,640 B1
(45) Date of Patent: May 28, 2002

(54) MIXING ACCESSORY HAVING FLEXIBLE WIRES MOUNTED IN A CROSSED MANNER

(75) Inventors: Jean-Paul Astegno, Esposy; Carole Tompa, Tarbes; Patrick Garrigues, Pierrefitte-Nestalas, all of (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 09/509,212

(22) PCT Filed: Sep. 25, 1998

(86) PCT No.: PCT/FR98/02057

§ 371 (c)(1),
(2), (4) Date: Mar. 24, 2000

(87) PCT Pub. No.: WO99/15060

PCT Pub. Date: Apr. 1, 1999

(30) Foreign Application Priority Data

Sep. 25, 1997 (FR) ............................................ 97 12173

(51) Int. Cl.[7] ................................................ A47J 43/07
(52) U.S. Cl. ....................................... 366/129; 366/343
(58) Field of Search ........................ D7/376–380, 412, D7/688, 690; 416/69, 70 R, 72, 76, 77, 230, 240, 241 R, 241 A; 15/141.1, 141.2; 99/348; 366/129, 130, 342–344, 325.6, 326.1, 607, 325.94, 328.1

(56) References Cited

U.S. PATENT DOCUMENTS

| | | | |
|---|---|---|---|
| 332,375 A | * | 12/1885 | Baltzley |
| 409,616 A | * | 8/1889 | Richardson |
| 506,635 A | * | 10/1893 | Harvey |
| 1,417,982 A | | 5/1922 | Fitzpatrick |
| 1,463,736 A | * | 7/1923 | Ward |
| 1,579,382 A | * | 4/1926 | Mitchell |
| 1,783,437 A | | 12/1930 | Laib |
| 3,328,005 A | * | 6/1967 | McMaster et al. |
| 3,441,254 A | * | 4/1969 | Merke, Jr. |
| 4,735,510 A | * | 4/1988 | Barbour et al. |
| 5,938,325 A | * | 8/1999 | Edwards |

FOREIGN PATENT DOCUMENTS

| | | |
|---|---|---|
| DE | 42 15 400 | 11/1993 |
| FR | 1270820 | 7/1961 |
| FR | 1596721 | 7/1970 |
| FR | 2225128 | 11/1974 |
| GB | 771 156 | 3/1957 |

* cited by examiner

Primary Examiner—Charles E. Cooley
Assistant Examiner—Richard W. Ward
(74) Attorney, Agent, or Firm—Browdy and Neimark

(57) ABSTRACT

The invention concerns a cooking accessory (1) for a domestic or household electrical cooking appliance, designed to be used in a cooking vessel, comprising a operation element (2) and a work tool (8) mounted on the operation element (2). The invention is characterized in that the work tool consists of flexible wires (3) defining a cage capable of being deformed against a wall of the cooking vessel to match the shape of said wall. The flexible wires (3) are mounted in a crossed manner between the operation element (2) and a holding element (9). The invention also concerns a domestic or electrical household appliance comprising such an accessory.

13 Claims, 7 Drawing Sheets

MIXING ACCESSORY HAVING FLEXIBLE WIRES MOUNTED IN A CROSSED MANNER

TECHNICAL FIELD

The present invention relates to the general technical field of accessories for culinary preparation mounted on an electrical household appliance for culinary preparation of the household food processor or beater type, or on a household appliance for culinary preparation, as well as electrical household appliances for culinary preparation having such accessories.

By food processor, it is in order to understand an electrical household appliance for culinary preparation having a working receptacle and in which the working tool is operated, driven by the motor of the appliance. Such an appliance is generally provided to operate with different types of tools such as for example, tools for grating, slicing, chopping, kneading, mixing, emulsifying beating.

By beater, it is in order to understand, an electrical household appliance for culinary preparation having at least one working tool for mixing, emulsifying, beating, said appliance not having an associated working receptacle, and being provided on the contrary to be held in the users hand in order to be utilized in any appropriate receptacle.

By household culinary preparation appliance, it is in order to understand a mechanical household appliance transforming at least in part the movement furnished by the user to communicate it to the working tool in contact with the preparation.

By accessory for preparation of mixtures, emulsions, mousses and dispersions, it is in order to understand a working tool provided to the mounted on an electrical household appliance for culinary preparation, and which permits production of the above-cited preparations.

An emulsion is a dispersion of small drops of fatty matter in water or an aqueous solution, or inversely a dispersion of droplets of aqueous solutions in fatty matter. Mayonnaise, bearnaise sauce, cream are emulsions of the "oil in water" type. Butter is an emulsion of the "water in oil" type.

A mousse is a dispersion of bubbles of a gas in a liquid, or in a solid. Egg whites beaten until they are stiff are, for example, a mousse.

Culinary preparations such as emulsions or mousses cause physico-chemical reactions to intervene, activated by a mechanical preparation. The texture of the preparation depends on the agitation supplied to the initial mixture of ingredients. In particular, a rather fine texture, having a better stability than a coarser texture, can be desired. Such a texture is in effect more stable because it offers a larger surface between the included materials, which are air for mousses and oil for emulsions, and the matrix, which is constituted most often by an aqueous solution. The presence of tensio-active molecules, such as proteins or lecithins, at the interface between the water on the one hand, and the oil or air on the other hand, contributes to stabilize the included material.

In order to provide the emulsions or mousses, culinary utensils such as whisks are utilized.

PRIOR ART

In the traditional version, the whisk is a manual utensil having a handle to one of the ends of which are fixed and angularly distributed metal wires curved in a manner to form a cage and each of the ends of which is fixed to the handle. Such a whisk is for example described in the document U.S. Pat. No. 884,085.

This type of whisk can be mounted on a household appliance for culinary preparation, such as described in the document U.S. Pat. No. 1,007,891.

The document FR 1 596 721 describes a manual whisk having a plurality of substantially flat branches of plastic material. Each branch is constituted either by a plate portion pierced with openings, or adjoining substantially filiform elements, forming a lattice. The lattice comprises substantially filiform parts disposed longitudinally in the direction of the axis of the whisk, and other parts transversely connecting the preceding parts, in a manner to increase the rigidity of the branches of the whisk. The different branches of this whisk can be molded simultaneously, in a manner to form a monoblock assembly, or molded in the form of distinct elements provided with attachment means.

The use of manual appliances requires a certain dexterity, as regards the mode of operation and the speed of execution. In addition, the duration of utilization to obtain a desired result can appear to the user to be long. Consequently, the result obtained with such appliances is not assured.

In addition the contact of the whisk with the working receptacle is a source of noise, in particular when the whisk is metal and the working receptacle is made of a very rigid and non-damping material such as glass, metal or ceramic. In comparison with metal whisks, whisks having flat branches of plastic material have less deformability which causes the work to be more difficult when the whisk strikes the wall of the working receptacle. For all of these reasons the utilization of such manual appliances is eventually tiresome.

Food processors or beaters can achieve a more constant result with less effort.

The document DE 42 15 400 describes a processor on which is mounted a dough tool driven in a planetary movement.

The document FR 1 270 820 describes a mixing element for a beater, made entirely of plastic material. This mixing element is composed of a cylindrical part furnished with a driving element extended by a body forming a whisk followed by arms forming a cage. The material utilized is for example a polyamide, which permits a certain flexibility of the body. It is thus possible to elastically deform the body by flexure of these whisks by an angle which can reach 30°.

Such a tool mounted on a beater can be utilized against the wall of the working receptacle due to its deformation properties. These are, however, limited and require the user to constantly apply a force in order to scrape the walls well, despite the utilization of an electrical appliance. In addition, the application of this force on the tool for each of the portions of the wall of the working receptacle is, of course, not easy.

The mounting of such a tool on a processor supposes for a correct and durable operation that the tool will not enter into contact with the walls of the receptacle. It is as a result difficult to correctly work the material present against the wall.

The document FR 2 058 049 describes a tool for an electric beater, permitting achievement at the same time of kneading of dough as well as agitation and beating of the more liquid products such as egg whites or cream. The tool has several branches of metal wire curved in a spiral and connected in the form of a basket. Agitation and beating are notably assured by connection of the branches in the form of a basket.

A rigid tool such as a metal tool cannot be properly used in contact in with the working receptacle, because it will cause annoying noise or degradation of the wall of the receptacle. It is difficult to correctly work the material present against the walls with such a tool. In order to work as much material as possible, the user must precisely control the movement which he gives to the appliance in order for the tool to pass as close to the walls as possible without striking them. The comfort of utilization of such an appliance is limited if the user wants to obtain good preparation results.

All of these tools are in addition difficult to clean. One part of the prepared material remains on the surface of the tools after withdrawal thereof from the working receptacle. These tools have numerous surfaces which are difficult to reach, such as the interior of the metal whisks or even the zones which are concave or which have a small radius of curvature for whisks made of plastic material.

SUMMARY OF THE INVENTION

The object of the invention is to propose an electrical household appliance for culinary preparation having an accessory for culinary preparation which remedies the drawbacks cited above and which permits production of mousses and emulsions while working more completely all of the product present in the working receptacle.

Another object of the invention is to propose an accessory for culinary preparation offering a great ease of utilization and of cleaning.

Another object of the invention is to propose an accessory for culinary preparation which permits a high quality of preparation due to the attainment of a fine and/or very homogenous texture for the material forming the preparation, thus aiding the stability of said preparation.

Another object of the invention is to propose an accessory for culinary preparation for which the contact of the working tool with a working receptacle produces a noise signature compatible with the perception of a normal utilization of the accessory.

Another object of the invention is to propose an accessory for culinary preparation which permits improving the mixing of the preparation.

Another object of the invention is to propose an electrical household appliance for culinary preparation having a working tool for mixtures, emulsions, mousses and dispersions.

Another object of the invention is to propose a household appliance for culinary preparation having a working tool for mixtures, emulsions, mousses and dispersions.

The goals assigned to the invention are achieved with an electrical household appliance for culinary preparation of the food processor type, having a case in which is disposed a motor associated with a transmission element, a working receptacle, and an accessory for culinary preparation comprising an operation element and a working tool, characterized in that the working tool forms a cage and is constituted by at least one flexible wire and in that the cage is elastically deformed by a wall of the working receptacle when the operation element is mounted on the transmission element.

Thus, due to the deformation properties of the flexible wire or wires forming the working tool it is possible to create mousses and emulsions while working against the wall of the working receptacle, without risk of degradation of said wall or of deterioration of the working tool. The working tool entering into contact with the wall of the receptacle, whether turning in the product undergoing preparation or not, produces a noise signature compatible with the perception by the user of a normal utilization of said accessory. For all of these reasons, the working tool can enter into contact in a repeated manner with the wall of the working receptacle in the framework of a normal utilization. The contact of the wire or wires of the working tool with wall aids the creation of eddies in the preparation around the wire or wires, which is desirable during production of emulsions, mixtures or dispersions, or aids the entry of air into the preparation, which is desirable during the production of mousses, and permits in the two cases to obtain fine textures. Contact of the wire or wires of the working tool with the wall renders possible the working of all material present in the receptacle and thus aids the obtaining of a very homogenous preparation. It is thus possible to attain a good quality of preparation due to the interaction of the wire or wires of the working tool with the walls. Such an accessory presents, in addition, a high level of comfort and a great ease of use, since the user does not have need to maintain a precise position of the working tool with respect to the walls of the receptacle. The working tool is, in addition, very easy to clean due to its malleability. Such an accessory can also be used with a high degree of safety, since the working tool does not present sharp edges. The user does not risk being injured when handling the accessory, particularly when installing it, withdrawing it, or cleaning it. In addition, the presence of ribs in the working receptacle does not interfere with the utilization of the working tool.

The goals assigned are equally achieved with an accessory for culinary preparation for a household or electrical household appliance for culinary preparation, intended to be utilized in a working receptacle, having an operation element and a working tool mounted on the operation element, characterized in that the working tool is constituted by at least one flexible wire defining a cage capable of being deformed against a wall of the working receptacle to substantially mate with the form of said wall, the flexible wire or wires forming loops connected by a holding element disposed preferably opposite the operation element.

This arrangement permits connecting together the loops formed by the wire or wires and permits a better efficiency in mixtures having a certain viscosity such as soft doughs particularly.

Advantageously, the flexible wire or wires are mounted in a crossed manner between the operation element and the holding element.

This arrangement assures a better rigidity of the working tool which aids the production of certain preparations, while retaining the flexibility necessary for a deformation of said working tool against the wall of the working receptacle.

The flexible wire or wires equipping the accessory for culinary preparation according to the invention are preferably made of a polymer material.

The goals of the invention are equally achieved with an electrical household appliance for culinary preparation of the food processor or beater type, having a motor disposed in a case and driving by the intermediary of a transmission element, the operation element of an accessory for culinary preparation according to the invention.

The user can thus benefit from all of the energy necessary to make the best use of the accessory for culinary preparation according to the invention.

The goals of the invention are equally achieved with a household appliance for culinary preparation having a drive means connected to a transmission means driving the operation element of an accessory for culinary preparation according to the invention.

The user can also benefit from the advantages provided by the accessory for culinary preparation according to the invention in an inexpensive appliance.

BRIEF DESCRIPTION OF THE DRAWINGS

Other particularities and advantages will become more readily apparent from a reading of the description given hereafter in reference to the attached drawings given by way of illustrative but nonlimiting examples in which:

FIG. 7b shows a detailed view of a part of FIG. 7a.

FIG. 7c shows a detailed view of another part of FIG. 7a.

THE BEST MANNER OF CARRYING OUT THE INVENTION

The accessory for culinary preparation 1 according to the invention is provided to be mounted on a household or electrical household appliance for culinary preparation and is intended to be utilized in a working receptacle.

Figure 10:
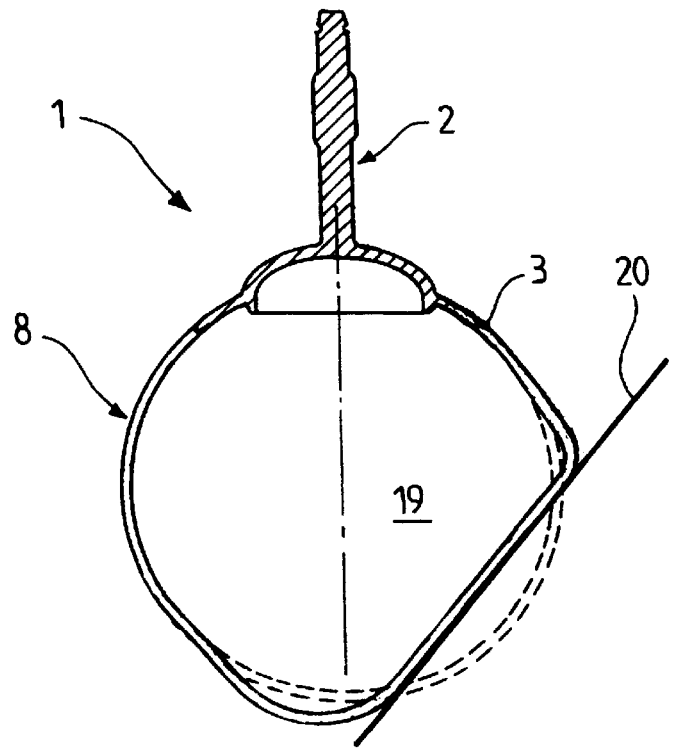
FIG. 10 shows according to a partial view in longitudinal cross section an accessory for culinary preparation according to the invention in contact with a working receptacle.

Accessory 1 has an operation element 2 on which is mounted a working tool 8 constituted by at least one flexible wire 3 defining a cage 19 capable of being deformed against a wall 20 of a working receptacle to substantially mate with the form of said wall. As shown in FIG. 10, wire 3 is deformed by wall 20. Each wire 3 brought into contact with wall 20 is thus capable of being deformed elastically. Cage 19 formed by wire or wires 3 is flexible and deformable.

Preferably, culinary preparation accessory 1 has a plurality of flexible wires 3.

As shown in FIGS. 1 to 6, at least one of the two ends 7 of flexible wires 3 is advantageously mounted on operation element 2.

Figure 1:
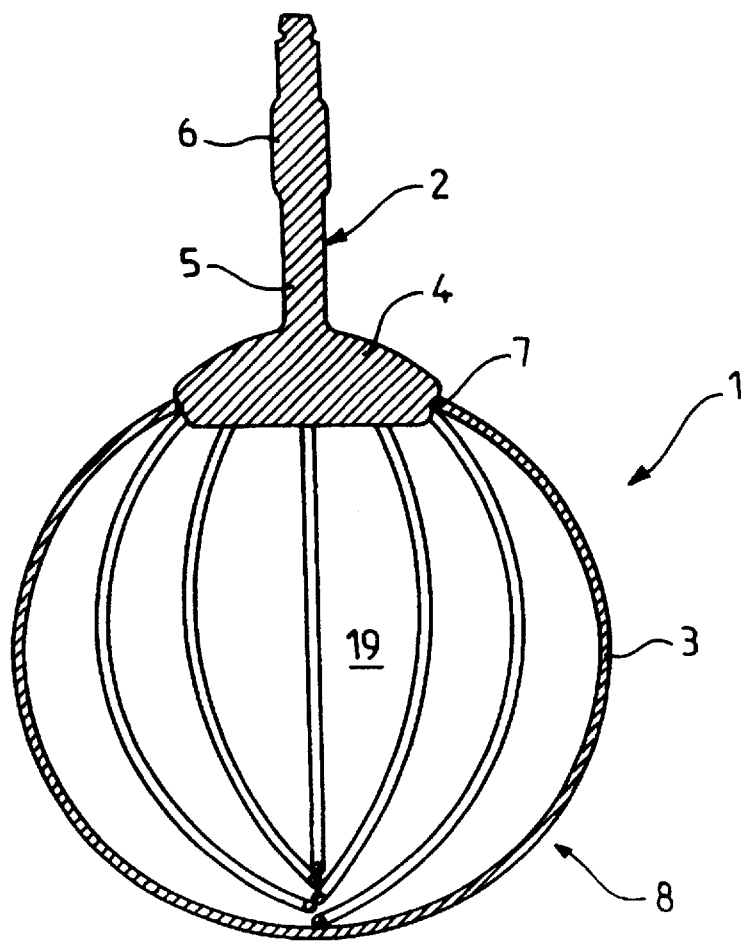
FIG. 1 shows a side view in cross section of an example of construction of an accessory for culinary preparation according to the invention.
Figure 2:
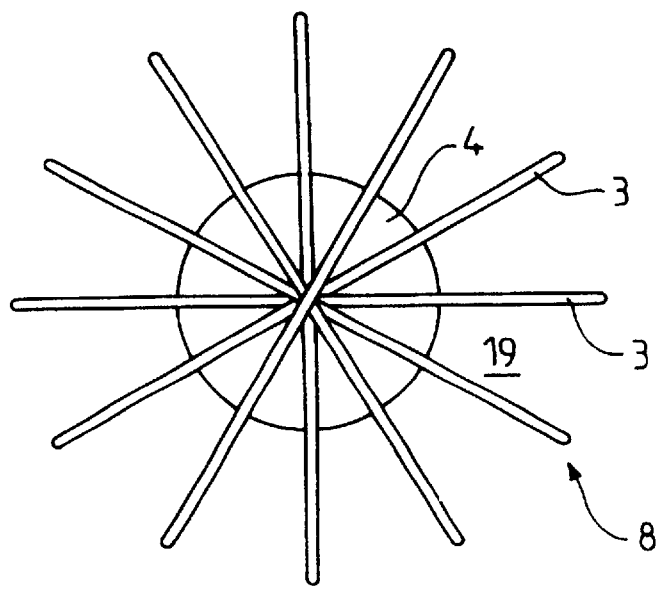
FIG. 2 shows a bottom view of an example of construction of an accessory for culinary preparation according to the invention.
Figure 3:
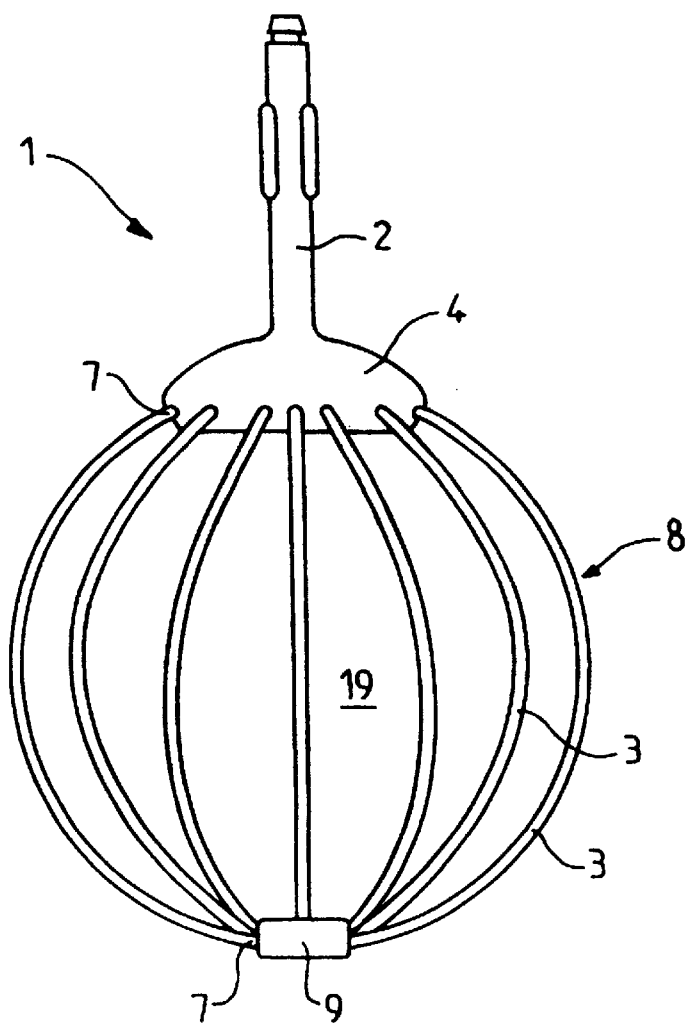
FIG. 3 shows a side view of another example of construction of an accessory for culinary preparation according to the invention.
Figure 4:
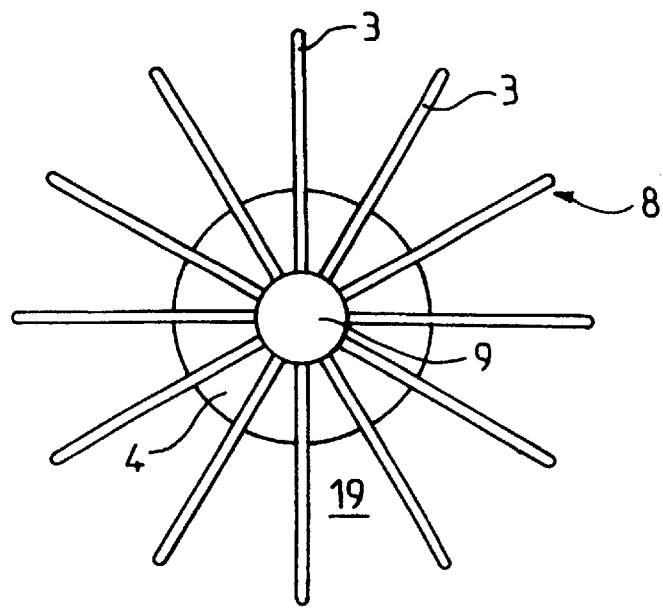
FIG. 4 shows a bottom view of another example of construction of an accessory for culinary preparation according to the invention.

According to the example of construction shown in FIGS. 1 and 2, the two ends 7 of wires 3 are mounted on operation element 2. Each wire 3 thus forms a loop. Wires 3 can be substantially of the same length, as shown in FIG. 1, even of identical length, or of different lengths.

Cage 19 defined by wires 3 is of substantially spherical form, or of any other appropriate form, for example, in a pear-shaped form. The arrangement of wires 3 defining cage 1 is of meridian geometry, such as shown in FIGS. 1 to 4, or of any other appropriate geometry.

As shown in FIG. 1, ends 7 of flexible wires 3 are mounted on the periphery of a circular disc 4 prolonging an axle 5 of operation element 2. Axle 5 advantageously has planes 6 provided for mounting said accessory on an electrical household or household appliance for culinary preparation.

Culinary preparation accessory 1 shown in FIGS. 1 and 2 includes six flexible wires 3 mounted at their two ends 7 on operation element 2 and distributed regularly around the axis of said operation element.

In an advantageous manner, flexible wires 3 form loops connected by a holding element 9 preferably disposed opposite operation element 2. According to the example of construction shown in FIGS. 3 and 4, one end 7 of flexible wires 3 is mounted on operation element 2 while the other end 7 is mounted on a holding element 9, disposed preferably opposite operation element 2. Flexible wires 3 being elastically deformable, holding element 9 is thus movable with respect to operation element 2. Culinary preparation accessory 1 shown in FIGS. 3 and 4 has twelve flexible wires 3 distributed angularly around operation element 2. Other variations not shown in the figures are envisionable to produce holding element 9, for example to utilize holding wires or even to cement or solder the loops formed by wires 3 mounted on operation element 2.

Figure 5:
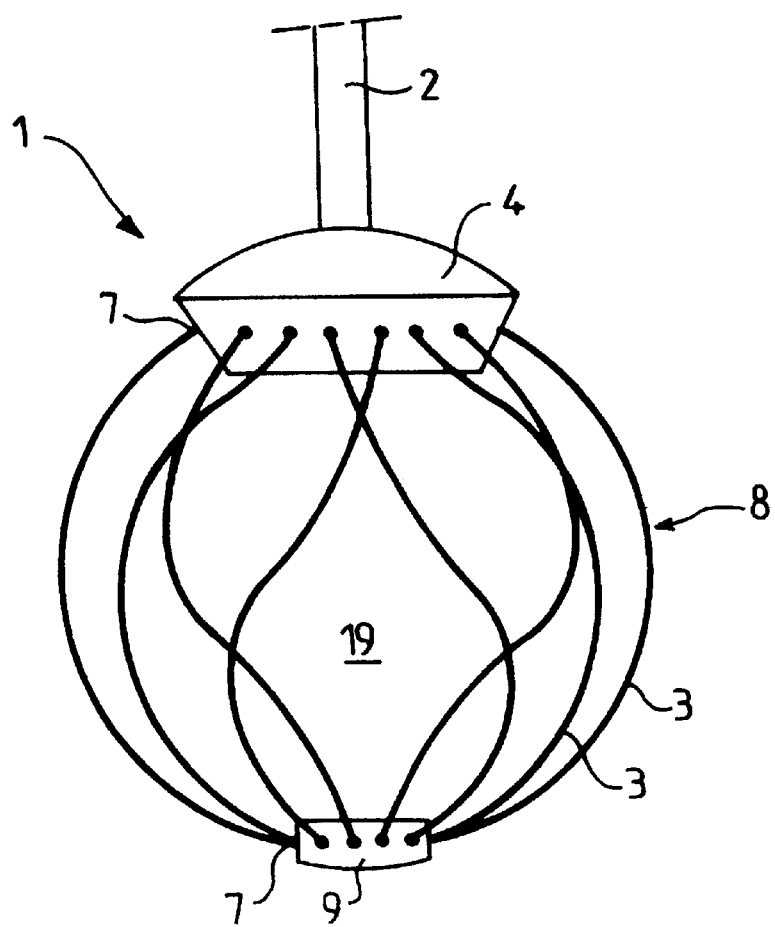
FIG. 5 shows a side view of a third example of construction of an accessory for culinary preparation according to the invention.
Figure 6:
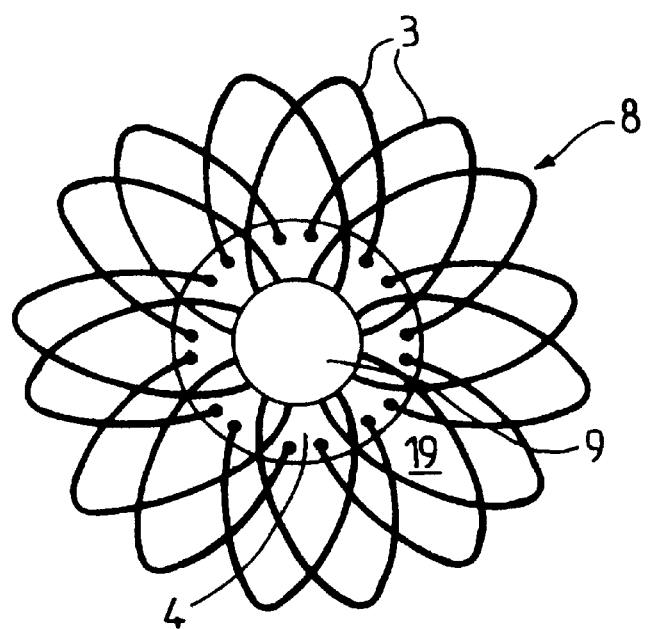
FIG. 6 shows a bottom view of a third example of construction of an accessory for culinary preparation according to the invention.

According to a preferred construction variation shown in FIGS. 5 and 6, flexible wires 3 are mounted in a crossed manner between operation element 2 and holding element 9. Each wire 3 crosses at least one of the other wires 3 mounted between operation element 2 and holding element 9. This arrangement can also be utilized when wires are mounted at their two ends on operation element 2.

The angular distribution of wires 3 around operation element 2 is advantageously periodic, such as shown in the figures.

The flexible wire 3 can be made of any material compatible with food utilization, having appropriate flexibility and rigidity characteristics, in a manner to assure an effective working of the preparation while allowing deformation of cage 19 of culinary preparation accessory 1 according to the invention without irreversible plastic deformation of said wires. Polymer materials, such as for example, polyamides, polypropylenes or elastomers, are particularly suitable for construction of flexible wires 3. The utilization of wires 3 reinforced at least along a part of their length by a metal core for the purpose of obtaining a greater stiffness can be envisioned.

Flexible wires 3 preferably have a circular cross section, which is favorable for flexure or torsional deformations. Other geometries are of course envisionable, such as elliptical, fluted, polygonal, even variable, or also wires constituted by several filaments braided or not, and possibly covered with a protective layer.

According to an advantageous version of the invention, surface treatments permit the wettability of the wires to be adapted in order to facilitate their cleaning or even to aid the physical-chemical reactions intervening during culinary preparations.

Figure 7A:
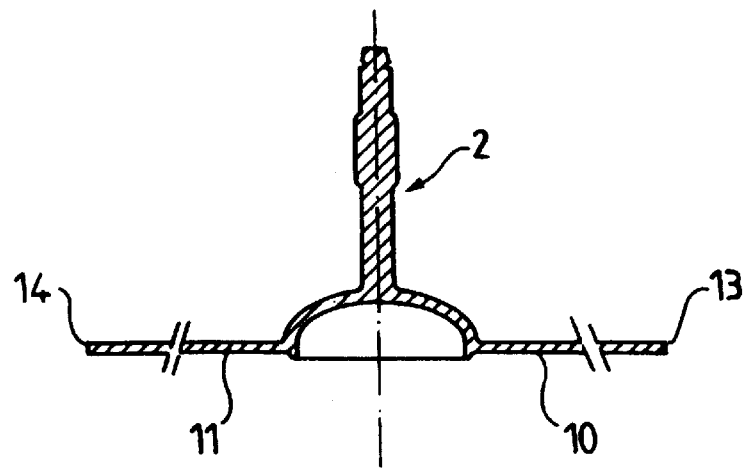
FIG. 7a shows a partial longitudinal cross section of a variant of construction of an example of construction of an accessory for culinary preparation according to the invention before its final assembly.
Figure 7C:
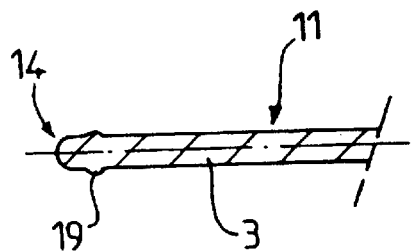
Figure 7B:
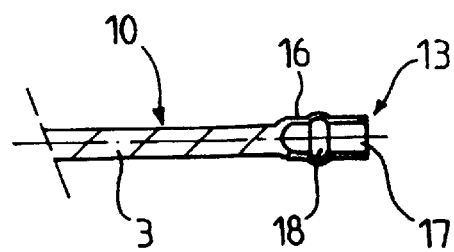
Figure 8:
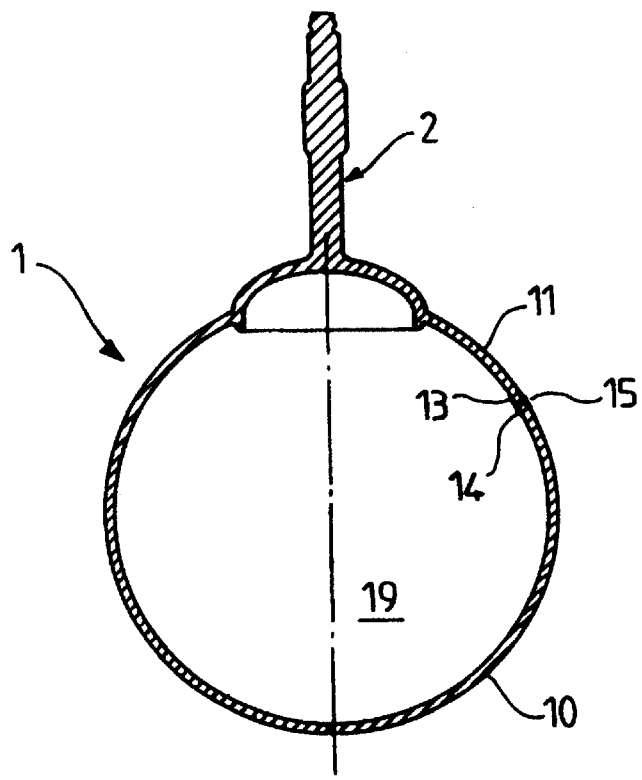
FIG. 8 shows according to a partial view in longitudinal cross section a variant of construction of an example of construction of an accessory for culinary preparation according to the invention after its final assembly.

According to a preferred version of the invention, operation element 2 and at least one of flexible wires 3 are made from a single piece, obtained for example by molding. FIG. 7a shows a partial cross-sectional view of operation element 2 extended by a pair of branches 10, 11 provided to form one flexible wire 3. FIG. 8 shows a partial cross-sectional view of culinary preparation accessory 1 constituted by operation element 2 and two branches 10, 11 connected by their extremities 13, 14 at the level of a junction 15, thus forming a flexible wire 3. Junction 15 is formed by any appropriate means, such as soldering, cementing, snapfitting. FIG. 7b shows a detailed view of an example of construction of end 13 of the first branch 10 provided for an assembly by snapfitting, in which said end 13 has a hollow sleeve 16 extending wire 3 and defining an interior space 17. Sleeve 16 has an interior angular groove 18. FIG. 7c shows a detailed view of an example of construction of end 14 of second branch 11 provided for an assembly by snapfitting, in which end 14 has an annular thickened part 19 advantageous provided to cooperate with annular groove 18 when end 14 of branch 11 is inserted into space 17 formed at end 13 of branch 10, thus achieving a snapfit.

Culinary preparation accessory 1 constructed in a single piece can obviously have several pairs of branches 10, 11. When junction 15 is formed by snapfitting, the user can himself assure final assembly of the pairs of branches 10, 11. It can equally be envisioned that at least one of wires 3 is constituted by a single branch one of the ends 7 of which issues from operation element 2 and the other is mounted on operation element 2, thus forming a loop.

Figure 9:
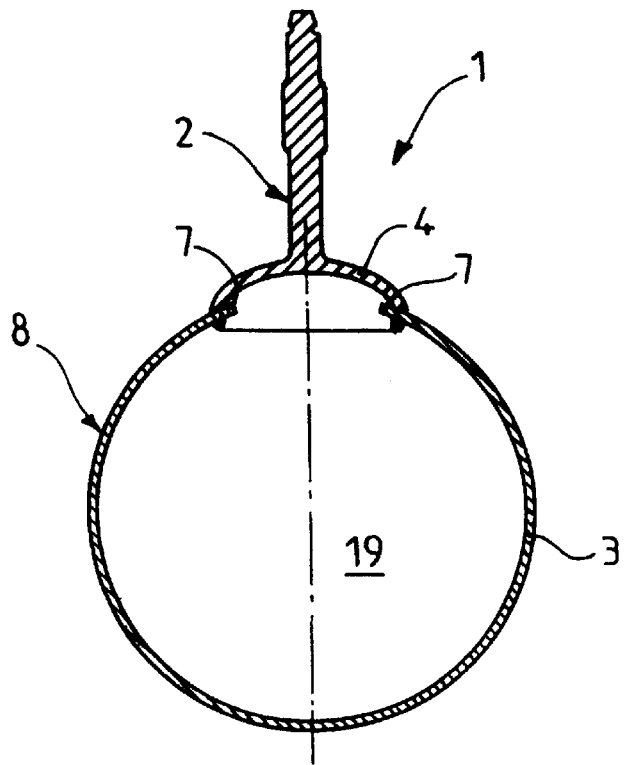
FIG. 9 shows according to a partial view in longitudinal cross section another variant of construction of an accessory for culinary preparation according to the invention.

According to another version of the invention, operation element 2 and flexible wires 3 are made of distinct parts. The connection between operation element 2 and flexible wires 3 is obtained by any appropriate means, such as soldering, cementing, snapfitting. FIG. 9 shows according to a partial view in longitudinal cross-section another example of construction of a culinary preparation accessory 1 according to the invention, in which ends 7 of flexible wire 3 are mounted on circular disc 4 of operation element 2. Several wires 3 can be mounted in this manner around circular disc 4.

According to a variant of construction, not shown in the figures, at least one of the flexible wires 3 and holding element 9 are constituted by a single piece, produced, for example, by molding.

As shown in FIG. 10, flexible wire 3 mounted on operation element 2 brought into contact with a wall 20, forming for example part of a working receptacle, deforms elastically in contact with said wall. It is thus possible to utilize culinary preparation accessory 1 according to the invention against wall 20 without risk of deterioration of said wall or of said accessory.

Advantageously, working tool 8 has several families of wires 3 with different cross-sections. In a manner still more advantageous, working tool 8 has several families of wires 3 with different stiffnesses. The culinary preparation accessory according to the invention can have for example a first family of wires 3 provided to scrape wall 20 of the working receptacle and a second family of wires 3 provided to mix the interior of the preparation.

By way of a variant, a single flexible wire 3 mounted on operation element 2 can form working tool 8. Wire 3 is then mounted at several points on operation element 2. Wire 3 can form several loops, advantageously connected by a holding element 9. In a manner still more advantageous, wire 3 is mounted in a crossed manner between operation element 2 and holding element 9.

Culinary preparation accessory 1 according to the invention can be advantageously mounted on an electrical household culinary preparation appliance.

Figure 11:
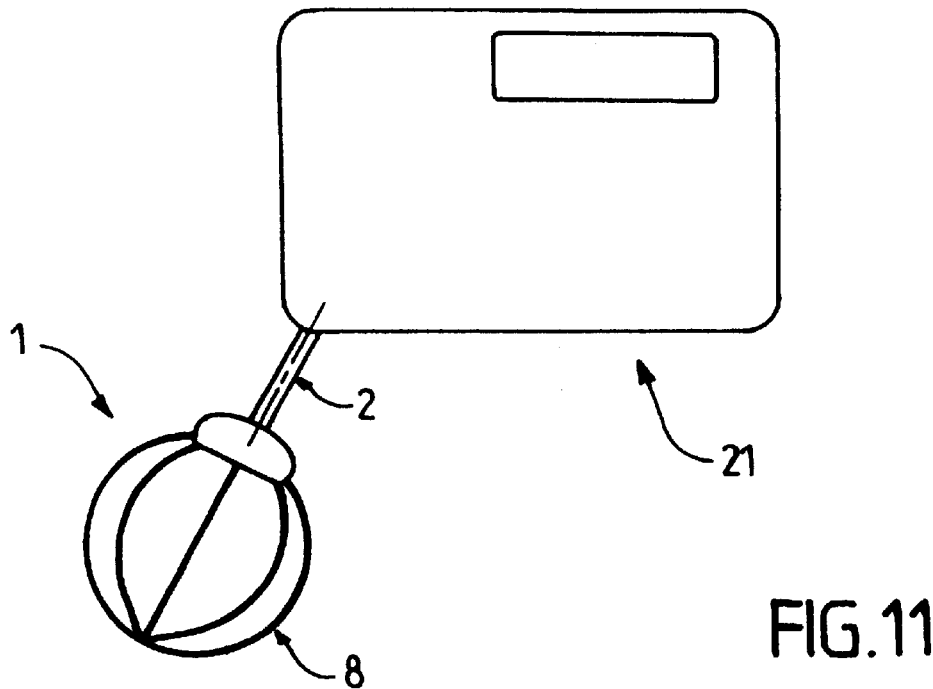
FIG. 11 shows a diagram of a beater having an accessory for culinary preparation according to the invention.

FIG. 11 represents in a schematic manner a beater 21 having an electric motor associated with a transmission, not shown in the figures, on which is mounted in a known manner and advantageously in a removable fashion operation element 2 of culinary preparation accessory 1. Beater 21 is utilized with any appropriate working receptacle for producing the desired preparation and advantageously communicates a rotational movement to culinary preparation accessory 1.

Figure 12:
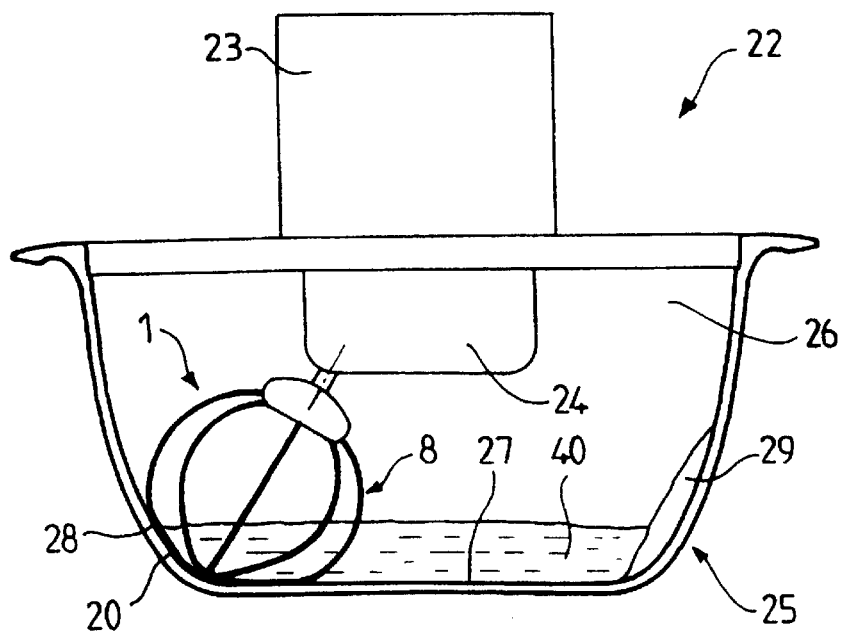
FIG. 12 shows a diagram of a food processor having an accessory for culinary preparation according to the invention.

FIG. 12 represents in a schematic manner a food processor 22 having an electric motor disposed in a case 23, associated with a transmission element 24 on which is mounted advantageously in a removable manner operation element 2 of culinary preparation accessory 1.

Food processor 22 also has a working receptacle 25 provided to contain foodstuffs 40. Receptacle 25 is of any appropriate form, for example substantially cylindrical and of wide mouth form, as shown in FIG. 12. Receptacle 25 is delimited by a wall 20 having a bottom wall 27 and a lateral wall 28, and has an opening 26 opposite to bottom wall 27. The working receptacle can have one or several ribs 29 extending on lateral wall 28. Other forms are envisionable for receptacle 25. Notably, the lateral wall or the bottom wall can deviate from a geometry of revolution.

It is to be noted that a working receptacle having one or several ribs, and/or the walls of which do not have a geometry of revolution is incompatible with a rigid working tool.

Working receptacle 25 is made of any material compatible with food utilization and advantageously of glass, ceramic, vitroceramic, metal or plastic material. The geometric variations observed particularly with glass receptacles are not troublesome for utilization of accessory 1 due to the deformability of working tool 8.

As shown in FIG. 12, case 23 of food processor 22 is advantageously disposed above opening 26 of receptacle 25. This disposition eliminates the need for a hollow shaft extending from bottom wall 27 and serving for the passage of a shaft for transmitting movement between the motor and culinary preparation accessory 1. Receptacle 25 is fixed with respect to case 23.

As variations it is equally envisionable for receptacle 25 to be mounted to be driven in a rotation with respect to case 23 or for receptacle 25 to be mounted to be freely rotatable with respect to case 23, the access of rotation of receptacle 25 preferably being distinct from the access of rotation of operation element 2 of accessory 1. According to this latter arrangement, culinary preparation accessory 1 can entrain the working receptacle containing a preparation.

As shown in FIG. 12, case 23 of food processor 22 closes opening 26 of receptacle 25. This arrangement permits the escape of foodstuffs 40 from receptacle 25 to be avoided.

Advantageously, as shown in FIG. 12, transmission element 24 imparts to culinary accessory 1 a planetary movement. Other types of movements such as for example a continuous or alternating rotation movement are equally envisionable.

Culinary preparation accessory 1 is mounted in a manner such that at least a part of working tool 8 comes periodically in contact with wall 20 during movement of culinary preparation accessory 1 in working receptacle 25 of food processor 22 according to the invention.

Advantageously, the presence of at least one rib 29 on wall 20 of working receptacle 25 permits rotation of working tool 8 to be locally disrupted and thus aids working of the preparation. Working tool 8 then comes periodically into contact with wall 20 of working receptacle 25 at the level of said rib 29.

According to another disposition of working tool 8 and receptacle 25, working tool 8 comes into contact with an annular zone of wall 20 of receptacle 25.

In a manner which is even more preferred, culinary preparation accessory 1 is mounted in a manner such that the major part of bottom wall 27 of working receptacle 25 is swept by working tool 8.

Figure 13:
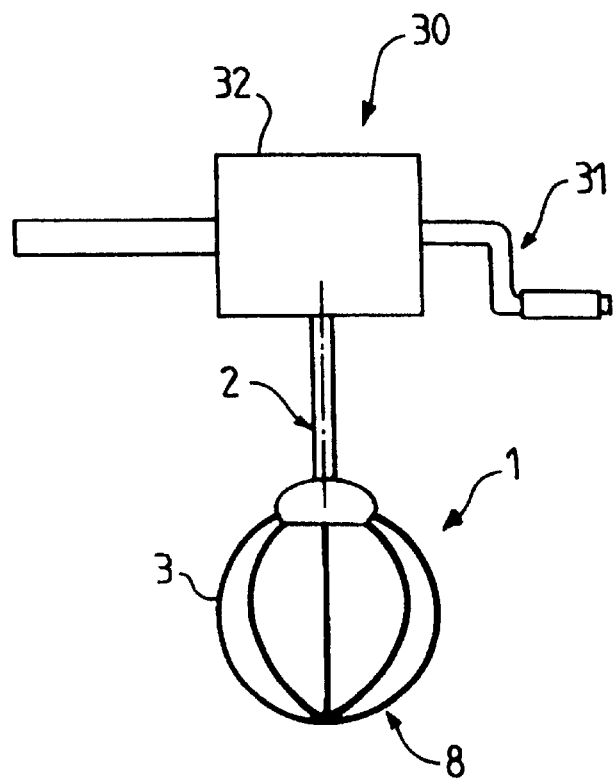
FIG. 13 shows a diagram of a household appliance having an accessory for culinary preparation according to the invention.

Culinary preparation accessory 1 according to the invention can equally be mounted on a culinary preparation household appliance 30. As shown in FIG. 13, culinary preparation household appliance 30 has a driving means 31 connected to known transmission means 32. Operation element 2 of culinary preparation accessory 1 is mounted in a known manner and advantageously in a removable fashion on transmission means 32.

According to a variant of construction, not shown in the figures, more than one accessory 1 is mounted on beater 21, processor 22, or household appliance 30, for example two accessories 1. Preferably, each accessory 1 is driven with the same type of movement, but other combinations are envisionable.

The user wanting to use beater 21, processor 22, or household appliance 30 furnished with culinary preparation accessory 1 according to the invention places all or a part of the different ingredients necessary for producing the desired preparation in working receptacle 25, if he uses processor 22, or in the other cases in any appropriate working receptacle.

The user using beater 21 furnished with culinary preparation accessory 1 according to the invention can bring working tool 8 into contact with wall 20 of the working receptacle without fear of deteriorating said culinary preparation accessory 1 or wall 20. The same is true during utilization of household appliance 30 furnished with the culinary preparation accessory according to the invention. The user does not have need to worry about the precise position of accessory 1 with respect to wall 20 of the receptacle and can concentrate on production of the preparation. He can also reach more easily the totality of wall 20 of the receptacle covered with food material and by this produce a more homogenous mixture of the ingredients constituting the food material product. Each of wires 3 forming working tool 8 is capable of coming periodically in contact with wall 20 of the working receptacle in the framework of a normal utilization of the appliance furnished with accessory 1.

In processor 22 furbished with culinary preparation accessory 1 according to the invention, working tool 8 enters into contact with wall 20 of working receptacle 25, preferably along an annular surface or even in a periodic manner at the level of rib 29.

During entry of a part of working tool 8 into contact with wall 20, certain wires 3 are deformed elastically. These wires tend to resume their position when they leave contact with wall 20. Rotation of working tool 8 in the preparation obtained by the movement of transmission element 24 of processor 22, the movement imparted by beater 21 or by household appliance 30 associated preferably with the movement conferred by the user, permits obtaining a dynamic deformation of said working tool when the latter comes in contact with wall 20. The dynamic deformation of working tool 8 aids the creation of eddies in the preparation around wires 3, a desirable phenomenon particularly when producing emulsions, mixtures, or dispersions, since it leads to an intimate mixing of the food materials and permits obtaining a fine texture. Dynamic deformation of working tool 8 also aids entry of air into the preparation, an important phenomenon during production of mousses, since it permits expansion of the preparation to be increased and a fine texture to be obtained.

The contact of wires 3 of working tool 8 with wall 20 renders possible the working of all materials present in the receptacle and thus aids obtaining very homogenous preparations. Accessory 1 equally permits obtaining a fine texture improving the stability of the preparations.

There results from all of these advantages provided by the present invention a high quality preparation. Beater 21 or food processor 22 provided with culinary preparation accessory 1 according to the invention notably permit obtaining without effort, preparations such as mixtures, dispersions, emulsions or mousses with a high quality result.

Working tool 8 of culinary preparation accessory 1 mounted on beater 21, processor 22 or household appliance 30 is deformed elastically when it enters into contact with wall 20 of the working receptacle and produces a noise signature compatible with the perception by the user of a normal utilization of said accessory.

Culinary preparation accessory 1 according to the invention is in addition very easy to clean and can be used reliability and without danger due to the malleability of working tool 8.

Possiblity of Industrial Application

The invention finds its application in the general technical field of electrical household appliances for culinary preparation, of the multi-use food processor type.

What is claimed is:

1. Accessory (1) for culinary preparation for a household or electrical household appliance for culinary preparation, intended to be utilized in a working receptacle, having a working tool (8) mounted on an operation element (2), the working tool (8) being constituted by one or several flexible wires (3) forming loops defining a cage (19) capable of being deformed against a wall (20) of the working receptacle to substantially mate with the form of said wall, the accessory further comprising a holding element (9) joining said loops together, the holding element being movable with respect to the operation element (2), wherein the flexible wire or wires (3) are mounted in a crossed manner between the operation element (2) and the holding element (9).

2. Accessory according to claim 1 characterized in that at least one of the two ends (7) of the or each flexible wire (3) is mounted on the operation element (2).

3. Accessory according to claim 1 wherein the holding element is disposed opposite the operation element.

4. Accessory according to claim 1 characterized in that the flexible wire or wires (3) are mounted in a periodic manner around the axis of the operation element (2).

5. Accessory according to claim 1 characterized in that the flexible wire or wires (3) are made of polymer material.

6. Accessory according to claim 1 characterized in that the wire (3) or at least one of the wires (3) has a substantially circular cross section.

7. Accessory according to claim 1 characterized in that the wire (3) or at least one of the wires (3) is formed from the operation element (2) or from the holding element (9) by molding.

8. Accessory according to claim 1 characterized in that the wire (3) or at least one of the wires (3) has a fluted cross section.

9. Accessory according to claim 1 characterized in that the working tool (8) has several families of wires (3) with different sections.

10. Accessory according to claim 1 characterized in that the working tool (8) has several families of wires (3) of different stiffnesses.

11. Electrical household appliance for culinary preparation of the beater (21) or food processor (22) type, having a motor disposed in a case (23) and driving, by the intermediary of a transmission element (24), the operation element (2) of an accessory (1) for culinary preparation according to claim 1.

12. Household appliance (30) for culinary preparation having a drive means (31) connected to a transmission means (32) driving, by the operation element (2) at least one accessory (1) for culinary preparation according to claim 1.

13. Accessory according to claim 1 wherein the holding element is connected to the wire or wires at points of the wire or wires that are most distant from the operation element.

* * * * *